March 4, 1958  E. J. KUEHNI ET AL  2,825,255
MUSICAL CHRISTMAS TREE STAND
Filed May 11, 1953  2 Sheets-Sheet 1

INVENTORS
FRITZ BAUMBERGER
ERWIN J. KUEHNI
BY CARL F. SUTHERLAND
Attorney

March 4, 1958  E. J. KUEHNI ET AL  2,825,255
MUSICAL CHRISTMAS TREE STAND
Filed May 11, 1953  2 Sheets-Sheet 2

INVENTORS
FRITZ BAUMBERGER
ERWIN J. KUEHNI
CARL F. SUTHERLAND
BY
Attorney

United States Patent Office 2,825,255
Patented Mar. 4, 1958

2,825,255

MUSICAL CHRISTMAS TREE STAND

Erwin J. Kuehni, Carl F. Sutherland, and Fritz Baumberger, Madison, Wis.; said Kuehni and said Sutherland assignors to Miniature Organ Enterprises, Inc., a corporation of Wisconsin Application May 11, 1953, Serial No. 356,244

(Filed under Rule 47(a) and 35 U. S. C. 116)

4 Claims. (Cl. 84—83)

This invention relates to a revolving Christmas tree stand and more particularly to such a stand which is adapted to hold a tree, to cause the tree to rotate and to simultaneously produce music.

Heretofore it has been known to provide Christmas tree holders which simultaneously provide for rotation of the tree and produce music but the music produced by the devices of the prior art has been inadequate in tone and volume since all such devices have utilized a Swiss-music-box-type of music producing mechanism. Some of these devices have been provided with various appurtenances adapted to cause vari-colored lights to shine on the tree and to produce like effects. This invention provides a unique mechanism which may be easily and economically produced which both rotates the tree and provides a superior quality of music since the music-producing-device is of the reed-organ-type rather than the Swiss-music-box-type.

It is therefore an object of this invention to provide means for simultaneously supporting a Christmas tree and causing it to rotate and producing music of superior quality.

Another object is such a device in which the music is produced with reed-organ-means and the tune is determined by an endless perforated strip of paper which may easily be replaced to change the tune.

Further objects will become apparent from the drawings and the following detailed description in which it is our intention to illustrate the applicability of the invention without thereby intending to limit its scope to less than that of all equivalents and in which like reference numerals refer to like parts and in which.

Figure 1:
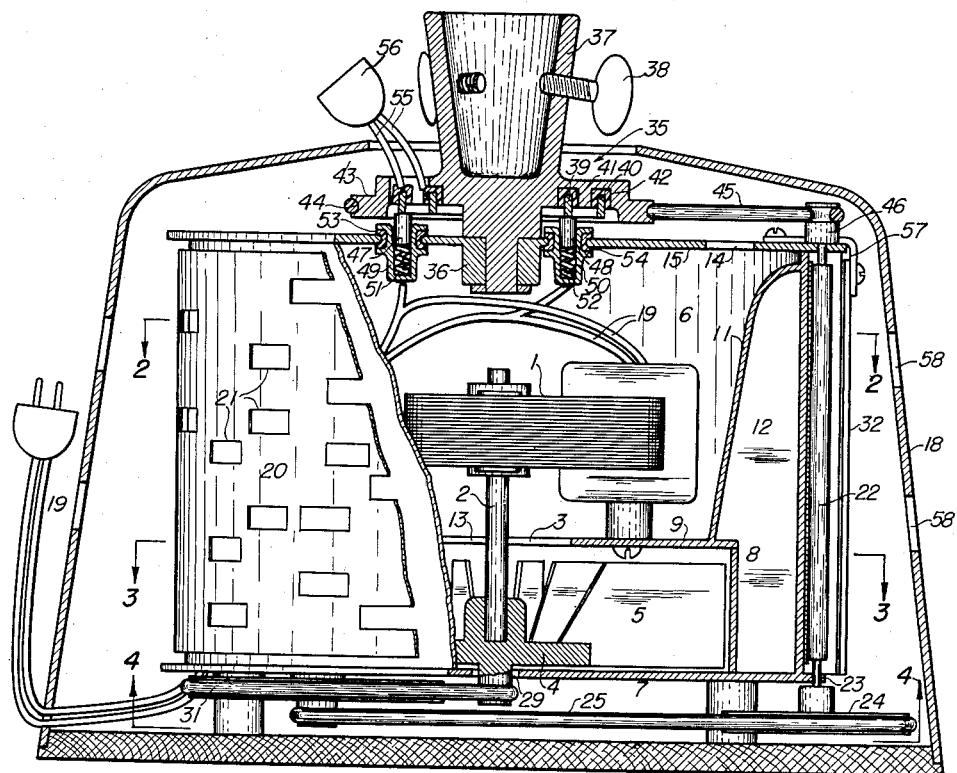
Figure 1 is a partially cut-away, partially cross-sectional view from one side of the device of the invention.
Figure 2:
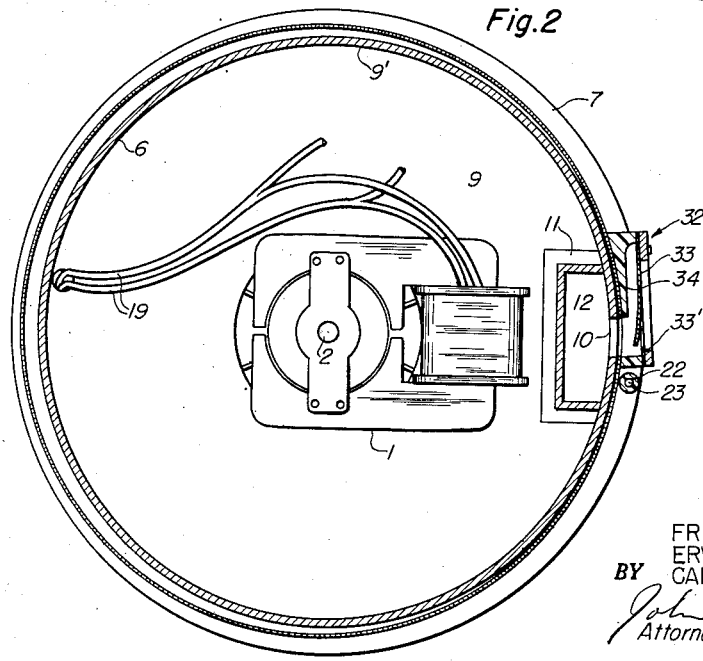
Figure 2 is a horizontal cross-sectional view of the device of the invention taken at the point indicated by lines 2—2 in Figure 1.
Figure 3:
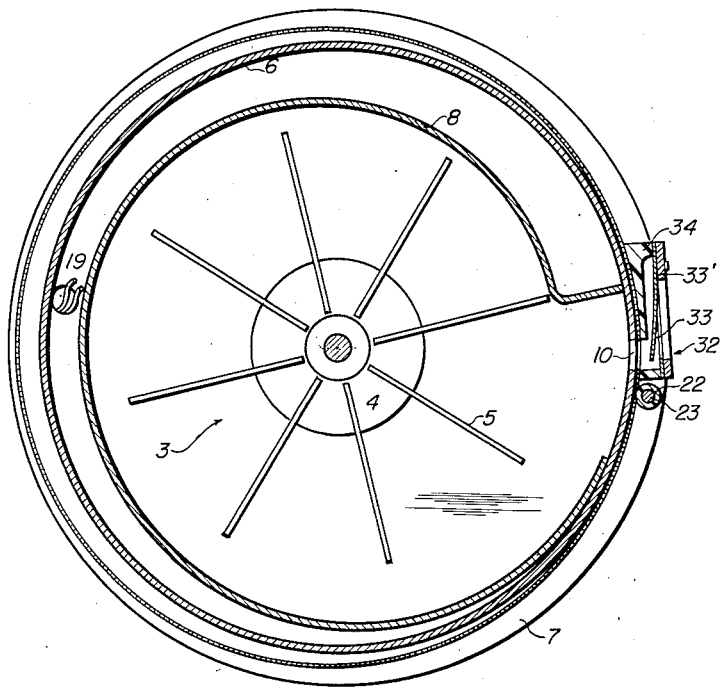
Figure 3 is a horizontal cross-sectional view of the device taken at the point indicated by lines 3—3 in Figure 1.
Figure 4:
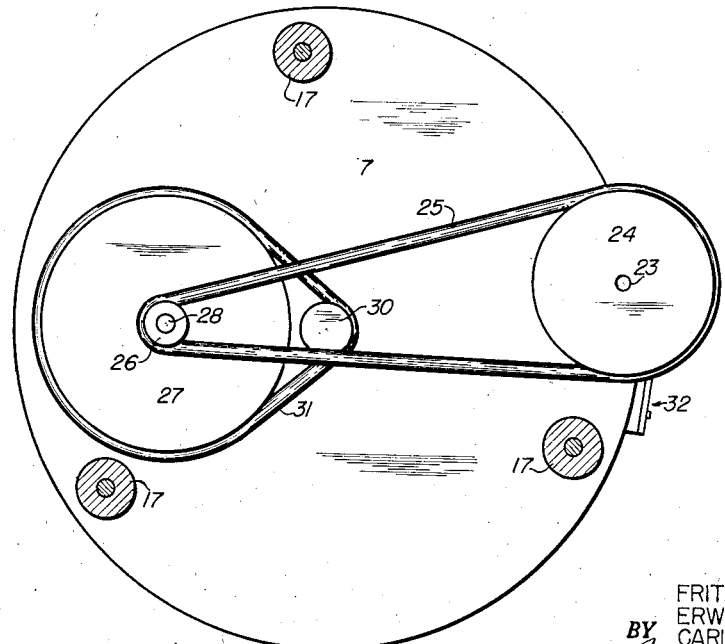
Figure 4 is an end-view of the bottom end of the device of the invention without a housing taken at the point indicated by the lines 4—4 in Figure 1.

Electric motor 1 is provided with an extended armature shaft 2 which has mounted on one end thereof a rotating fan indicated generally by the numeral 3, consisting of hub 4 and blades 5. The motor is disposed inside a drum 6, which is enclosed at the bottom end with a plate 7. Fan 3 may be enclosed by a housing consisting of portion of plate 7, a plate 8 extending vertically upward from plate 7 and extending around fan 3 in a helical manner and top plate 9 attached to plate 8. Motor 1 may be mounted on plate 9 as shown and plate 9 may extend beyond the upper edges of plate 8 and may be in contact with or attached to the interior surface of drum 6 at 9' in order to provide greater rigidity of the structure. A longitudinal aperture 10 may be provided in the wall of drum 6. An enclosure 11 may provide an air-passage 12 connecting slot 10 with the widest portion of the space defined by the fan housing. Opening 13 may be provided in plate 9 surrounding shaft 2 to allow air to enter the fan housing from within the interior of the drum and openings 14 may be provided in top plate 15 which encloses the top end of the drum to allow air to enter from the exterior into the interior of the drum.

The drum may be mounted on a wooden base 16 by means of legs 17 attached thereto and to the bottom of plate 7 and a housing 18 may extend substantially around the entire deivce and may be attached to the base 16 at its periphery. The device may be provided with electric conductors 19 adapted to supply electric current to the motor and to collector ring brushes which will be described below.

An endless strip 20 of paper or other suitable material may extend around the drum and be retained in place by top and bottom flanges consisting of marginal portions of bottom plate 7 and top plate 15 extending beyond drum 6. The strip may be perforated with a plurality of openings or perforations 21 and may be made of any suitable material such as a paper having considerable strength or a synthetic resinous material such as a polymer comprising vinyl chloride, vinyl acetate, vinylidine chloride, co-polymers of vinyl chloride and vinylidine chloride, co-polymers of vinyl acetate and vinyl chloride, cellulose esters such as cellulose acetate and cellulose nitrate and cellulose mixed esters such as cellulose acetate butyrate and other polymers such as polyethylene, polyamides, polyacrylonitriles, polyesters.

Roller 22 may be engageable with the surface of drum 6 and may actually engage strip 20; it may be made of rubber and may be mounted on shaft 23 which may extend through holes in the flanges provided by the extending portions of end plates 7 and 15 and it may be provided with a sheave 24 attached to the bottom portion of shaft 23 which may project below end plate 7. Belt 25 may extend around sheave 24 and also around smaller driving sheave 26, which may be attached to a larger sheave 27. The sheave unit comprising sheaves 26 and 27 may be mounted on a stub-shaft 28 projecting downwardly from plates 7. A portion of fan-hub 4 may extend downwardly through a hole 29 in end plate 7 and may be suitably grooved to form a sheave 30. Belt 31 may extend around sheaves 30 and 27. Thus, roller 22 may be adapted to be driven by motor 1 acting respectively through sheave 30, belt 31, sheave 27, sheave 26, belt 25 and sheave 24 attached to shaft 23 of roller 22. Roller 22 may thus rotate and by frictional engagement with strip 20, cause strip 20 to rotate slowly around the drum 6.

A music-producing reed mechanism indicated generally as 32 may be disposed adjacent slot 10 with strip 20 being interposed there in between. Device 32 may consist of a reed-plate 33 having reeds stamped out therefrom, which may be made of metal and most suitably may be made of brass but also may be made of a synthetic resin in some cases. Said reed-plate 33 may be supported by reed-supporting plate 34, which may be metal or synthetic resin, and may be held in place against reed-supporting plate 34 by reed-holder plate 33', which may be metal or synthetic resin. Reed assembly 32 may be supported by being attached to top plate 15 with bracket 57.

A rotatable tree-holder member indicated generally as 35 may be rotatably mounted in bearing 36 which may be attached to top end plate 15. Member 35 may be provided with a tree-holding socket 37, which may have thumb-screws 38 extending through its walls to retain therein the base of a trunk of a Christmas tree. Collector rings 39 and 40 may be mounted in insulating material 41 and 42 in grooves in the bottom of outwardly extending flange-portion 43. The periphery of rotating member 35 may be grooved with groove 44 to provide a sheave around which belt 45 may run. Belt 45 may also travel around sheave 46 attached to the portion of shaft 23 extending upwardly beyond endplate 15. Member 35 may thus be rotated by belt 45 driven by pulley 46.

Brushes 47 and 48 may be mounted in brush holders 49 and 50 and may be urged upwardly against collector rings 39 and 40 by springs 51 and 52 resting on the bottom of brush holders 49 and 50. The brush holders may be mounted in top plate 15, insulated therefrom by insulating rings 53 and 54. Electrical conductors 19 may be attached respectively to the bottoms of the brush holders and electric current may thus pass from conductors 19 through the brushes, thence through the collector rings, thence to electrical conductors 55 attached thereto and to receptacle 56. Receptacle 56 may rotate with rotating member 35; electric lamps utilized to decorate a Christmas tree mounted in socket 37 may be supplied with electric current from receptacle 56.

Holes 58 may be provided in the outer surface of housing 18 to admit air to the interior thereof or to allow air to pass outward therethrough and to facilitate the passage of musical sound waves outwardly from the device.

In operation, electric current is supplied to motor 1 and motor 1 causes fan 3, roller 22 and tree holder 35 to rotate. Roller 22 causes strip 20 to rotate slowly around drum 6 and fan 5 causes air to pass through passage 12, thence out slot 10, through perforations 21 and thence through those reeds of reed device 32 which register with the perforations as strip 20 continuously passes between slot 10 and device 32. Successive perforations are brought into register with the reeds of device 32 and thus different reeds are actuated and reed-organ music is thereby produced. Meanwhile a Christmas tree may be rotated by member 35 while being lighted by electric current supplied from receptacle 56.

Although strip 20 may be adapted to play only a single tune, strip 20 may be easily replaced with any other strip, which may be perforated to play any other tune, by removing housing 18 and then removing the top plate 15, whereupon strip 20 may be slidably removed upwardly and another strip adapted to play another tune may be placed around drum 6 by sliding it downwards over from drum 6.

The device may be utilized for displaying objects other than Christmas trees. For example, a rotating table may be provided with a downwardly extending shaft adapted to be received in socket 37 or attached to member 35 in place of socket 37. An object to be displayed may then rest on the table.

The music producing parts of the device may be utilized separately from member 35, as for example in a toy church, or cathedral, and member 35 and associated parts may be omitted.

It may thus be seen that our invention is broad in scope and is not to be limited excepting by the claims.

Having thus disclosed our invention, we claim:

1. In a Christmas tree stand, a vertical drum, a plate covering the bottom end of said drum, supporting members extending downward from said bottom plate and adapted to support said stand, an electric motor inside said drum, a rotating blower fan inside said drum mounted on the armature shaft of said motor, a housing surrounding said fan comprising said bottom plate and a housing member inside said drum having an opening therein surrounding said shaft adapted to permit air to enter into said housing from the interior of said drum, a longitudinal aperture in the wall of said drum, an enclosure defining a passage which connects said housing to said aperture, a top plate covering the upper end of said drum provided with openings to allow air to enter from the exterior to the interior of said drum, said drum adapted to receive therearound a perforated endless strip of material, said top and bottom plates projecting beyond the outer surface of said drum and thereby adapted to act as flanges to retain said perforated endless strip around said drum, a roller on a shaft extending through holes in said extending portions of said top and bottom plates driven by said motor by means comprising a downward extension of said armature shaft through said bottom plate provided with a pulley thereon, a belt extending around said pulley and around a larger pulley on a jackshaft extending downward from said bottom plate, a second smaller pulley on said jackshaft attached to said larger pulley, a belt extending around said smaller pulley and around a large pulley attached to the portion of said roller shaft extending downward beyond said bottom plate, the said roller provided with a resilient surface adapted to cause said perforated endless strip to rotate slidably around said drum, a reed plate having reeds stamped out therefrom supported by suitable means adjacent said longitudinal aperture on the outer side of said endless perforated strip, a tree-supporting member rotatably mounted on said top plate and comprising a socket adapted to receive the base of the trunk of a Christmas tree and provided with a pulley and thereby adapted to be rotated by said motor acting through a belt extending around said pulley and a smaller pulley mounted on the portion of said roller shaft extending upward beyond said top plate, said rotatable member being provided with collector rings on its under side and with electrical conducting wires extending upward therefrom adapted to supply electrical current to lights mounted on said lamps mounted on said Christmas tree, and electrical contact means attached to said top plate and urged against said collector rings by springs.

2. In a Christmas tree stand, a vertical drum, a plate covering the bottom end of said drum, supporting members extending downward from said bottom plate and adapted to support said stand, an electric motor inside said drum, a rotating blower fan inside said drum mounted on the armature shaft of said motor, a housing surrounding said fan comprising said bottom plate and a housing member inside said drum having an opening therein surrounding said shaft adapted to permit air to enter into said housing from the interior of said drum, a longitudinal aperture in the wall of said drum, an enclosure defining a passage which connects said housing to said aperture, a top plate covering the upper end of said drum provided with openings to allow air to enter from the exterior to the interior of said drum, said drum adapted to receive therearound a perforated endless strip or material, said top and bottom plates projecting beyond the outer surface of said drum and thereby adapted to act as flanges to retain said perforated endless strip around said drum, a roller on a shaft extending through holes in said extending portions of said top and bottom plates driven by said motor, the said roller provided with a resilient surface adapted to cause said perforated endless strip to rotate slidably around said drum, a reed plate having reeds stamped out therefrom supported by suitable means adjacent said longitudinal aperture on the outer side of said endless perforated strip, a tree-supporting member rotatably mounted on said top plate and comprising a socket adapted to receive the base of the trunk of a Christmas tree and provided with a pulley and thereby adapted to be rotated by said motor acting through a belt extending around said pulley.

3. In a Christmas tree stand, a vertical drum, a plate covering the bottom end of said drum, supporting members extending downward from said bottom plate and adapted to support said stand, an electric motor inside said drum, a rotating blower fan inside said drum mounted on the armature shaft of said motor, a housing surrounding said fan comprising said bottom plate and a housing member inside said drum having an opening therein surrounding said shaft adapted to permit air to enter into said housing from the interior of said drum, a longitudinal aperture in the wall of said drum, an enclosure defining a passage which connects said housing to said aperture, a top plate covering the upper end of said drum provided with openings to allow air to enter from the exterior to the interior of said drum, said drum adapted to receive therearound a perforated endless strip of material, said top and bottom plates projecting beyond the outer surface of said drum and thereby adapted to act as flanges to retain said perforated endless strip around said drum, a roller on a shaft extending through holes in said extending portions of said top and bottom plates driven by said motor, the said roller provided with a resilient surface adapted to cause said perforated endless strip to rotate slidably around said drum, a reed plate having reeds stamped out therefrom supported by suitable means adjacent said longitudinal aperture on the outer side of said endless perforated strip, a tree-supporting member rotatably mounted on said top plate and comprising a socket adapted to receive the base of the trunk of a Christmas tree and provided with a pulley and thereby adapted to be rotated by said motor acting through a belt extending around said pulley and a smaller pulley mounted on the portion of said roller shaft extending upward beyond said top plate, said rotatable member being provided with collector rings on its under side and with electrical conducting wires extending upward therefrom adapted to supply electrical current to lights mounted on said lamps mounted on said Christmas tree, and electrical contact means attached to said top plate and urged against said collector rings by springs.

4. In a Christmas tree stand, a vertical drum, a plate covering the bottom end of said drum, supporting members extending downward from said bottom plate and adapted to support said stand, an electric motor inside said drum, a rotating blower fan inside said drum mounted on the armature shaft of said motor, a housing surrounding said fan comprising said bottom plate and a housing member inside said drum having an opening therein surrounding said shaft adapted to permit air to enter into said housing from the interior of said drum, a longitudinal aperture in the wall of said drum, an enclosure defining a passage which connects said housing to said aperture, a top plate covering the upper end of said drum provided with openings to allow air to enter from the exterior to the interior of said drum, said drum adapted to receive therearound a perforated endless strip of material, said top and bottom plates projecting beyond the outer surface of said drum and thereby adapted to act as flanges to retain said perforated endless strip around said drum, a roller on a shaft extending through holes in said extending portions of said top and bottom plates driven by said motor by means comprising a downward extension of said armature shaft through said bottom plate provided with a pulley thereon, a belt extending around said pulley and around a larger pulley on a jackshaft extending downward from said bottom plate, a second smaller pulley on said jackshaft attached to said larger pulley, a belt extending around said smaller pulley and around a large pulley attached to the portion of said roller shaft extending downward beyond said bottom plate, the said roller provided with a resilient surface adapted to cause said perforated endless strip to rotate slidably around said drum, a reed plate having reeds stamped out therefrom supported by suitable means adjacent said longitudinal aperture on the outer side of said endless perforated strip, a tree-supporting member rotatably mounted on said top plate and comprising a socket adapted to receive the base of the trunk of a Christmas tree and provided with a pulley and thereby adapted to be rotated by said motor acting through a belt extending around said pulley.

References Cited in the file of this patent

UNITED STATES PATENTS

| | | |
|---|---|---|
| 247,774 | Metzger | Oct. 4, 1881 |
| 329,473 | Meinhold | Nov. 3, 1885 |
| 883,745 | Riessner | Apr. 7, 1908 |
| 2,279,182 | Snyder | Apr. 7, 1942 |
| 2,469,884 | Massone | May 10, 1949 |
| 2,562,896 | Duncan | Aug. 7, 1951 |
| 2,587,778 | Tacy | Mar. 4, 1952 |
| 2,674,147 | Franklin | Apr. 6, 1954 |

FOREIGN PATENTS

| | | |
|---|---|---|
| 36,652 | Germany | Aug. 27, 1886 |
| 39,560 | Germany | June 11, 1887 |
| 45,844 | Germany | Jan. 16, 1889 |
| 53,009 | Germany | Aug. 6, 1890 |
| 39,196 | Austria | Oct. 11, 1909 |